(12) United States Patent
Sarangi

(10) Patent No.: US 10,694,591 B2
(45) Date of Patent: Jun. 23, 2020

(54) SYSTEM AND METHOD FOR HEATING AND RE-ROUNDING SPOOLABLE PIPE

(71) Applicant: TRINITY BAY EQUIPMENT HOLDINGS, LLC, Houston, TX (US)

(72) Inventor: Rutuparna Sarangi, Houston, TX (US)

(73) Assignee: TRINITY BAY E QUIPMENT HOLDINGS, LLC, Houston, TX (US)

( * ) Notice: Subject to any disclaimer, the term of this patent is extended or adjusted under 35 U.S.C. 154(b) by 0 days.

(21) Appl. No.: 16/176,139

(22) Filed: Oct. 31, 2018

(65) Prior Publication Data

US 2019/0132908 A1 May 2, 2019

Related U.S. Application Data

(60) Provisional application No. 62/579,320, filed on Oct. 31, 2017.

(51) Int. Cl.
*B23K 13/01* (2006.01)
*B23B 31/00* (2006.01)
*H05B 6/10* (2006.01)

(52) U.S. Cl.
CPC .................................. *H05B 6/104* (2013.01)

(58) Field of Classification Search
CPC .. H05B 6/104; C21D 9/52; C21D 1/26; C22F 1/08
USPC ......... 219/602, 607, 608, 610; 264/35, 40.1, 264/40.5, 269, 407, 412, 516, 562; 156/149, 287, 294; 138/97, 287
See application file for complete search history.

(56) References Cited

U.S. PATENT DOCUMENTS

| | | | |
|---|---|---|---|
| 1,295,048 A | 2/1919 | MacDonald | |
| 3,943,747 A | 3/1976 | Wesler | |
| 3,999,029 A | 12/1976 | Orr | |
| 4,232,813 A | 11/1980 | Eaton | |
| 4,380,917 A | 4/1983 | Uchida | |
| 4,867,921 A | 9/1989 | Steketee | |
| 5,676,009 A | 10/1997 | Bright | |
| 5,985,203 A | 11/1999 | Bowkett | |
| 2005/0170116 A1* | 8/2005 | Heinrich | C09D 177/02 428/36.91 |
| 2017/0239877 A1 | 8/2017 | Lin et al. | |

(Continued)

FOREIGN PATENT DOCUMENTS

| | | | |
|---|---|---|---|
| GB | 2211907 | 9/1991 | |
| GB | 2343581 A * | 5/2000 | G06F 1/1632 |
| GB | 2343581 | 2/2001 | |

(Continued)

OTHER PUBLICATIONS

United States Patent and Trademark Office; PCT Written Opinion of the International Searching Authority, issued in connection to PCT/US18/58382; dated Jan. 28, 2019; 8 pages; US.

(Continued)

*Primary Examiner* — Quang T Van

(74) *Attorney, Agent, or Firm* — Greenberg Traurig, LLP; Dwayne L. Mason; Mark G. Chretien

(57) ABSTRACT

A system includes a pipe heater configured to heat spoolable pipe to provide a heated spoolable pipe and a pipe re-rounder configured to re-round the heated spoolable pipe to provide a rounded spoolable pipe. The system may also include a controller configured to control the pipe heater and the pipe re-rounder.

20 Claims, 8 Drawing Sheets

(56) References Cited

U.S. PATENT DOCUMENTS

2017/0328494 A1* 11/2017 Finch .................. F16L 1/235
2019/0132908 A1   5/2019 Sarangi

FOREIGN PATENT DOCUMENTS

| JP | H02-276622 | 11/1990 |
| JP | 4207168 | 7/1992 |
| JP | 04207168 A * | 7/1992 |
| WO | 2016/168917 | 10/2016 |
| WO | 2019/089712 | 5/2019 |

OTHER PUBLICATIONS

United States Patent and Trademark Office; PCT International Search Report, issued in connection to PCT/US18/58382; dated Jan. 28, 2019; 3 pages; US.

Pakistan Patent Office; First Examination Report, issued in connection to application No. 745/2018; 1 page; Mar. 2020; Pakistan.

* cited by examiner

SYSTEM AND METHOD FOR HEATING AND RE-ROUNDING SPOOLABLE PIPE

CROSS-REFERENCE TO RELATED APPLICATIONS

This application claims the benefit, and priority benefit, of U.S. Provisional Application 62/579,320 filed Oct. 31, 2017, the disclosure of which is incorporated by reference herein in its entirety.

BACKGROUND

Flexible pipe is useful in a myriad of environments, including in the oil and gas industry. Flexible pipe may be durable and operational in harsh operating conditions and can accommodate high pressures and temperatures. Flexible pipe may be bundled and arranged into one or more coils to facilitate transporting and using the pipe.

Coils of pipe may be positioned in an "eye to the side" or "eye to the sky" orientation. When the flexible pipe is coiled and is disposed with its interior channel facing upwards, such that the coil is in a horizontal orientation, then the coils of pipe are referred to as being in an "eye to the sky" orientation. If, instead, the flexible pipe is coiled and disposed such that the interior channel is not facing upwards, such that the coil is in an upright or vertical orientation, then the coils of pipe are referred to as being in an "eye to the side" orientation.

The flexible pipe may be transported as coils to various sites for deployment (also referred to as uncoiling or unspooling). Different types of devices and vehicles are currently used for loading and transporting coils of pipe, but usually extra equipment and human manual labor is also involved in the process of loading or unloading such coils for transportation and/or deployment. Such coils of pipe are often quite large and heavy. Accordingly, there exists a need for an improved method and apparatus for loading and unloading coils of pipe.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a system that includes a pipe heater configured to heat spoolable pipe to provide a heated spoolable pipe, and a pipe re-rounder configured to re-round the heated spoolable pipe to provide a rounded spoolable pipe.

In another aspect, embodiments of the present disclosure relate to a method that includes heating spoolable pipe using a pipe heater to provide a heated spoolable pipe, and re-rounding the heated spoolable pipe using a pipe re-rounder to provide a rounded spoolable pipe.

In another aspect, embodiments of the present disclosure relate to a system that includes a controller configured to control a pipe heating and re-rounding device that includes a pipe heater and a pipe re-rounder. The controller includes a processor configured to heat spoolable pipe using the pipe heater to provide a heated spoolable pipe, and re-round the heated spoolable pipe using the pipe re-rounder to provide a rounded spoolable pipe.

Other aspects and advantages of the claimed subject matter will be apparent from the following description and the appended claims.

DETAILED DESCRIPTION

Figure 1:
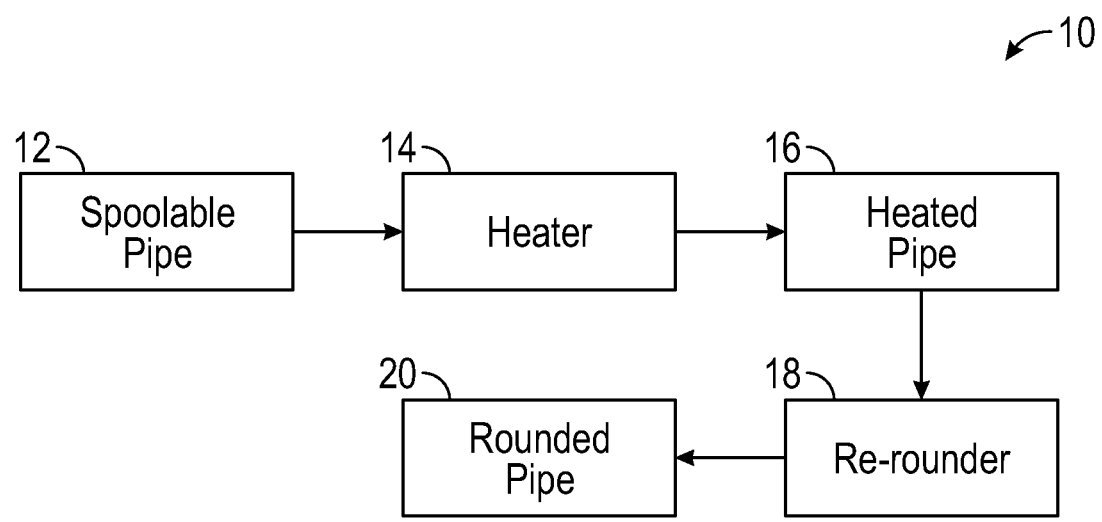
FIG. 1 is a block diagram of a pipe heating and re-rounding device according to embodiments of the present disclosure.

Embodiments of the present disclosure relate generally to systems used for deploying coils of spoolable pipe. The coils of pipe may be self-supported, for example, using bands to hold coils together, or the coils of pipe may be supported around a reel (which may be referred to as a reel of pipe). Deployment systems according to embodiments of the present disclosure may include a pipe heater configured to heat spoolable pipe to provide heated spoolable pipe and a pipe re-rounder configured to re-round the heated spoolable pipe to provide rounded spoolable pipe. In some embodiments, a controller may be configured to control a pipe heating and re-rounding device that includes the pipe heater and pipe re-rounder.

Embodiments of the present disclosure will be described below with reference to the figures. In one aspect, embodiments disclosed herein relate to embodiments for heating spoolable pipe using the pipe heater to provide heated spoolable pipe and re-rounding the heated spoolable pipe using the pipe re-rounder to provide the rounded spoolable pipe.

As used herein, the term "coupled" or "coupled to" may indicate establishing either a direct or indirect connection, and is not limited to either unless expressly referenced as such. The term "set" may refer to one or more items.

Wherever possible, like or identical reference numerals are used in the figures to identify common or the same elements. The figures are not necessarily to scale and certain features and certain views of the figures may be shown exaggerated in scale for purposes of clarification.

FIG. 1 illustrates a block diagram of an embodiment of a pipe heating and re-rounding system 10. As described in detail below, the system 10 includes spoolable pipe 12, which may refer to any type of flexible pipe or piping capable of being bent into a coil. The spoolable pipe 12 may be wound on a spool or reel, or the spoolable pipe 12 may be handled as coils without spools or reels. Such reels or coils of spoolable pipe 12 may reduce the amount of space taken up by pipe during manufacturing, shipping, transportation, and deployment compared to rigid pipe that is not capable of being bent into a coil.

Pipe, as understood by those of ordinary skill, may be a tube to convey or transfer any water, gas, oil, or any type of fluid known to those skilled in the art. The spoolable pipe 12 may be made of any type of materials including without limitation plastics, metals, a combination thereof, composites (e.g., fiber reinforced composites), or other materials known in the art. One type of spoolable pipe 12 is flexible pipe, which is used frequently in many applications, including without limitation, both onshore and offshore oil and gas applications. Flexible pipe may include Bonded or Unbonded Flexible Pipe, Flexible Composite Pipe (FCP), Thermoplastic Composite Pipe (TCP), or Reinforced Thermoplastic Pipe (RTP). A FCP/RTP pipe may itself be generally composed of several layers. In one or more embodiments, a flexible pipe may include a high-density polyethylene ("HDPE") liner having a reinforcement layer and an HDPE outer cover layer. Thus, flexible pipe may include different layers that may be made of a variety of materials and also may be treated for corrosion resistance. For example, in one or more embodiments, pipe used to make up a coil of pipe may have a corrosion protection shield layer that is disposed over another layer of steel reinforcement. In this steel-reinforced layer, helically wound steel strips may be placed over a liner made of thermoplastic pipe. Flexible pipe may be designed to handle a variety of pressures, temperatures, and conveyed fluids. Further, flexible pipe may offer unique features and benefits versus steel/carbon steel pipe lines in the area of corrosion resistance, flexibility, installation speed and re-usability. Another type of spoolable pipe is coiled tubing, which may be made of steel. Coiled tubing may also have a corrosion protection shield layer.

The pipe heating and re-rounding system 10 of FIG. 1 also includes a pipe heater 14 configured to heat the spoolable pipe 12 to provide heated spoolable pipe 16. For example, the pipe heater 14 may impart heat to the spoolable pipe 12 or cause the spoolable pipe 12 itself to heat up. For example, the pipe heater 14 may use at least one of inductive heating, resistive heating, conductive heating, convective heating, or radiative heating. Specific embodiments of the pipe heater 14 are described in more detail below. In certain embodiments, the spoolable pipe 12 may be resistant to unspooling, especially in cold weather. In other words, the spoolable pipe 12 may exhibit a memory effect such that the spoolable pipe 12 resists being uncoiled and/or resists returning to a circular cross-sectional shape from the ovalized cross-sectional shape when coiled. The heated pipe 16 may be less susceptible to this memory effect, thereby easing unspooling. Although use of the pipe heater 14 may be especially beneficial in cold weather deployment of the spoolable pipe 12, embodiments of the pipe heater 14 may be used in all types of climates and temperatures to facilitate deployment.

As shown in FIG. 1, the pipe heating and re-rounding system 10 also includes a pipe re-rounder 18 configured to re-round the heated pipe 16 to provide rounded spoolable pipe 20. In certain embodiments, the spoolable pipe 12 may have an oval cross-sectional shape when coiled. In other words, the spoolable pipe 12 may not have a circular cross-sectional shape. Embodiments of the pipe re-rounder 18 may use rollers or other components with circular or partially-circular shapes to re-shape the heated pipe 16 to have a circular or substantially circular cross-sectional shape when the rollers or other components are engaged with or pressed against the heated pipe 16. Specific embodiments of the pipe re-rounder 18 are described in more detail below. In addition, a distance between the pipe heater 14 and the pipe re-rounder 18 may be reduced to reduce heat loss from the heated pipe 16 to the environment, especially in cold weather.

Figure 2:
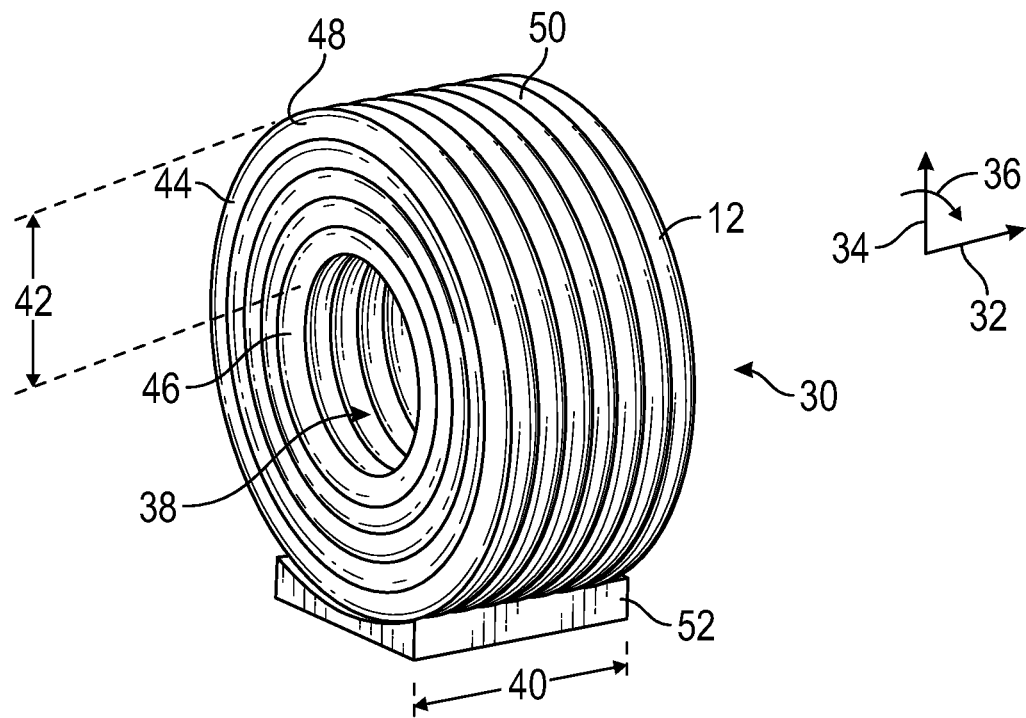
FIG. 2 is a perspective view of a coil of spoolable pipe according to embodiments of the present disclosure.

FIG. 2 illustrates a perspective view of an embodiment of a coil 30 of spoolable pipe 12. The coil 30 may be defined by an axial axis or direction 32, a radial axis or direction 34, and a circumferential axis or direction 36. The coil 30 may be formed by wrapping the spoolable pipe 12 into a coil with an interior channel 38 formed axially 32 therethrough, where the coil 30 may be moved as a single package or bundle of coiled pipe, as shown in FIG. 2. Each complete turn of coiled pipe may be referred to as a wrap of pipe. Multiple wraps of pipe in the coil 30 may be configured in columns along the axial direction 32 of the coil 30 and/or configured in layers along the radial direction 34 of the coil 30. For example, multiple columns of wraps may be formed along the axial direction 32 of the coil 30, where an axial dimension 40 of the coil 30 is based on the diameter of the pipe 12 and the number and axial 32 position of wraps forming the coil 30. Further, multiple layers of wraps may be formed along the radial direction 34 of the coil 30, where a radial dimension 42 of the coil 30 is based on the diameter of the pipe and the number and radial 34 position of the wraps forming the coil 30. In certain embodiments, a weight of the coil 30 may exceed 40,000 pounds (18,144 kilograms). In one or more embodiments, the coil 30 may be disposed on a reel, which is further discussed below in FIG. 3.

As shown in FIG. 2, the coil 30 of spoolable pipe 12 may be one or more layers (e.g., layers 44 and 46) of pipe packaged or bundled into the coil 30. The coil 30 may include at least one or more layers of pipe that have been coiled into a particular shape or arrangement. As shown in FIG. 2, the coil 30 is coiled into a substantially cylindrical shape, where the axial dimension 40 of the coil 30 is measured between outer edges 48 and 50 of the coil 30.

As known to those of ordinary skill in the art, the spoolable pipe 12 used to make up the coil 30 shown in FIG. 2 may be coiled using spoolers or other coiler machines suited for such a function. Those of ordinary skill will recognize that the present disclosure is not limited to any particular form of coiler or other device that may be used to form pipe into a coil. Winding pipe into a coil, such as 30, assists when transporting pipe, which may be several hundred feet in length in one or more embodiments. Further, the coil 30 may be wound to facilitate deployment of the spoolable pipe 12. Deployment, as described above and used herein, may refer to the action of unspooling or unwinding the spoolable pipe 12 from the coil 30. The spoolable pipe 12 may be installed underground, above ground, or in water.

After being assembled into a coil, the coil 30 shown in FIG. 2 may include the interior channel 38 formed axially 32 through the coil 30. The interior channel 38 is a bore disposed generally in the center of the coil 30. The interior channel 38 may be substantially circular-shaped. The coil 30 may have an outer diameter (OD) and an inner diameter (ID), where the inner diameter is defined by the interior channel 38.

As shown in FIG. 2, a skid 52 may be a platform upon which the coil 30 may be disposed to hold the coil 30 in a vertical orientation. In one or more embodiments, the coil 30 may be loaded and unloaded by a trailer, crane, forklift or other lifting device while remaining on the skid 52. In other embodiments, the coil 30 may be disposed upon a reel, as further described below in FIG. 3.

Figure 3:
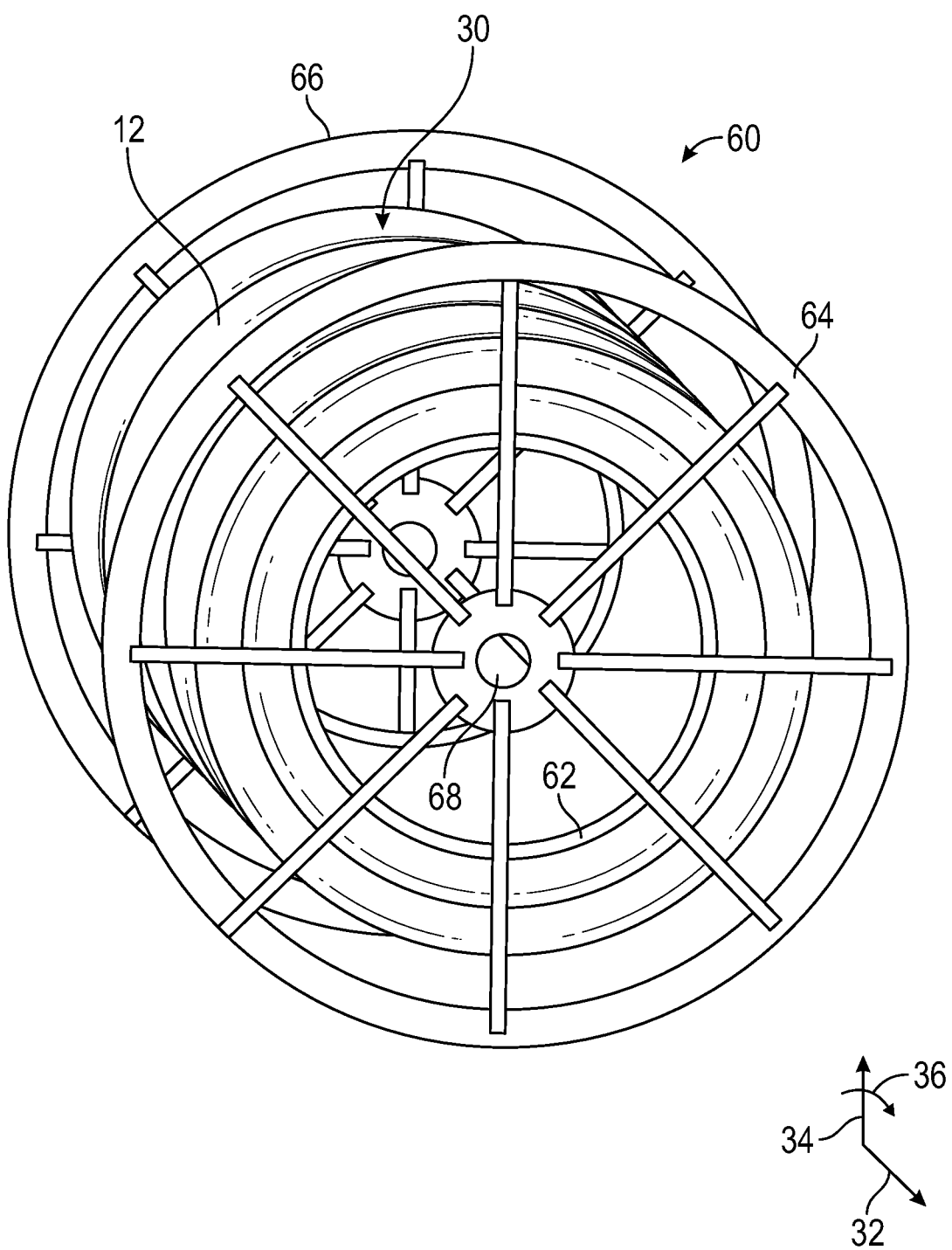
FIG. 3 is a perspective view of a reel of spoolable pipe according to embodiments of the present disclosure

FIG. 3 illustrates a perspective view of an embodiment of a reel 60 of spoolable pipe 12. In many instances, the coil 30 of spoolable pipe 12 may be wound around the components of the reel 60, instead of transported as a bundled, freestanding package (e.g., as shown in FIG. 2). The coil 30 may be wound around the reel 60 such that the interior channel of the coil 30 is concentric with a central bore of the reel 60. A reel, as understood by those of ordinary skill, may include a cylindrical drum, such as cylindrical drum 62, around which layers of pipe may be wrapped to form the coil 30. The reel 60 may include two substantially circular reel ends 64 and 66 that are capable of turning about a shared axis. Accordingly, the reel ends 64 and 66 may be attached to the cylindrical drum 62.

As shown in FIG. 3, a bore 68 is disposed in each end 64 and 66 at a substantially central position. In addition, the bores 68 for each end 64 and 66 are substantially aligned with each other (and may also be aligned with a central axis of cylindrical drum 62). Spoolable pipe 12 (e.g. flexible pipe) may be wound around the cylindrical drum 62 using any means known to those of ordinary skill in the art.

Figure 4:
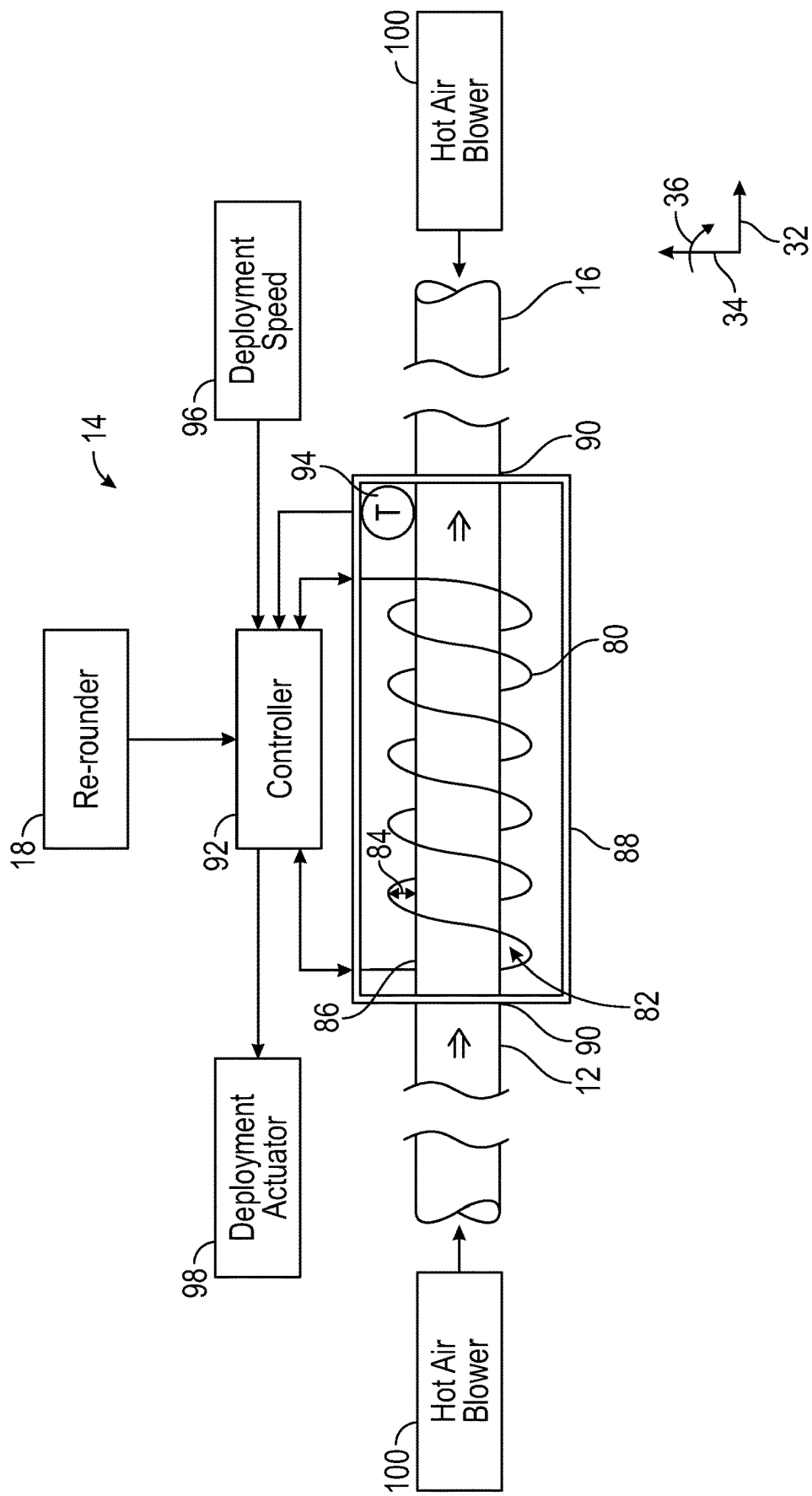
FIG. 4 is a schematic diagram of a pipe heater with an induction coil according to embodiments of the present disclosure.

FIG. 4 illustrates an embodiment of the pipe heater 14 with an induction coil 80, which may be an electrical conductor formed into a coil. The spoolable pipe 12 is heated using the induction coil 80 via the process of electromagnetic induction described in more detail below. As shown in FIG. 4, the spoolable pipe 12 may pass through an interior 82 of the induction coil 80 in the axial direction 32 without directly touching the induction coil 80. In other words, there is a gap 84 between an outer surface 86 of the spoolable pipe 12 and the induction coil 80. In certain embodiments, the induction coil 80 may be disposed in a cylindrical housing (not shown) to protect the induction coil 80 from contact with the spoolable pipe 12. In further embodiments, the induction coil 80 may be disposed in a thermal enclosure 88 to help contain heat within the thermal enclosure 88. The thermal enclosure 88 may include one or more layers of insulation to help improve the insulating characteristics of the thermal enclosure 88. The spoolable pipe 12 may enter and exit the thermal enclosure 88 through openings 90, which may be sealed to contain heat within the thermal enclosure 88.

In certain embodiments, the spoolable pipe 12 may include metal components, such as the steel-reinforced layer with helically wound steel strips described above. To heat spoolable pipe 12 that includes such metal components, an alternating current (AC) is passed through the induction coil 80 creating an alternating magnetic field that generates electric currents (e.g., eddy currents) within the metal components of the spoolable pipe 12. The eddy currents flowing through the resistance posed by the metal components of the spoolable pipe 12 heat the metal components through Joule heating. Heat may also be generated through magnetic hysteresis losses if the metal components of the spoolable pipe 12 are ferromagnetic or ferrimagnetic. The heat generated in the metal components then moves to the other components of the spoolable pipe 12 through heat conduction, thereby heating the overall spoolable pipe 12. In certain embodiments, a controller 92 may be used to provide the alternating current to the induction coil 80 or the controller 92 may be used to control a separate AC power supply. The controller 92 may be used to adjust the frequency and/or amperage of the alternating current.

In certain embodiments, the controller 92 may receive input signals from various sources to adjust the induction heating provided by using the induction coil 80. For example, as shown in FIG. 4, a temperature sensor 94 may provide a signal to the controller 92 indicative of a temperature of the heated pipe 16. In certain embodiments, the temperature sensor 94 may be disposed within the thermal enclosure 88 to measure the temperature of air or other fluid within the thermal enclosure 88 or the temperature of the heated pipe 16. For example, the temperature sensor 94 may be an infrared temperature sensor capable of measuring the temperature of the heated pipe 16 without contact. In other embodiments, the temperature sensor 94 may be disposed outside of the thermal enclosure 88 to measure the temperature of the heated pipe 16 exiting from the opening 90. If the measured temperature of the heated pipe 16 or the air or other fluid in the thermal enclosure 88 is less than a desired temperature, then the controller 92 may increase the frequency and/or amperage of the alternating current to the induction coil 80. Similarly, if the measured temperature is greater than the desired temperature, then the controller 92 may decrease the frequency and/or amperage of the alternating current.

In other embodiments of the pipe heater 14, the induction heating provided by using the induction coil 80 may be adjusted by the controller 92 based on a signal from the pipe re-rounder 18 as shown in FIG. 4. For example, if a measured amount of force required to re-round the heated pipe 16 is greater than a desired amount of force, then the controller 92 may increase the frequency and/or amperage of the alternating current to the induction coil 80, thereby increasing the rate of heating. Similarly, if the measured force is less than the desired force, then the controller 92 may decrease the frequency and/or amperage of the alternating current. In certain embodiments, the pipe re-rounder 18 or another component of the pipe heating and re-rounding system 10 may provide an indication of the extent of ovality of the spoolable pipe 12, such as via one or more calipers or similar measurement devices. If the measured ovality is high, then the controller 92 may increase the frequency and/or amperage of the alternating current, thereby improving the flexibility of the heated pipe 16 and reducing the amount of force that the re-rounder 18 imparts to the heated pipe 16. Similarly, if the measured ovality is low, then the controller 92 may decrease the frequency and/or amperage of the alternating current since the re-rounder 18 may provide less re-rounding. In further embodiments, other variables may be used to adjust the amounting of heating provided by the pipe heater 14, such as, but not limited to, pipe deployment tension as measured by a dynamometer, ambient air temperature, or temperature of the spoolable pipe 12.

In further embodiments, the induction heating may be adjusted by the controller 92 based on a signal provided by a deployment speed sensor 96, which may provide an indication of the deployment speed of the spoolable pipe 12, heated pipe 16 and/or rounded pipe 20. For example, as the deployment speed increases, the controller 92 may increase the frequency and/or amperage of the alternating current to the induction coil 80 to increase the rate of heating of the spoolable pipe 12. Similarly, as the deployment speed decreases, the controller 92 may decrease the frequency and/or amperage of the alternating current to decrease the rate of heating. In certain embodiments, a deployment actuator 98 may be used to adjust the deployment speed of the spoolable pipe 12, heated pipe 16 and/or rounded pipe 20. For example, the deployment actuator 98 may refer to a vehicle (e.g., backhoe) used to pull the rounded pipe 20, a vehicle (e.g., a trailer or ship) to move the coil 30 or reel 60 as the rounded pipe 20 deploys, or other device to control the deployment (e.g., a motor). The controller 92 may provide a signal to the deployment actuator 98 to adjust the deployment speed based on the measured temperature of the heated pipe 16 or air or other fluid in the thermal enclosure 88. For example, if the measured temperature is less than a desired temperature, then the controller 92 may slow the deployment speed by sending a signal to the deployment actuator 98, thereby enabling the induction coil 80 to increase the rate of heating of the spoolable pipe 12. Similarly, if the measured temperature is greater than the desired temperature, then the controller 92 may increase the deployment speed via the deployment actuator 98, thereby decreasing the rate of heating. Further, although discussed separately above, operation of the controller 92 may utilize one or more of the inputs simultaneously.

In certain embodiments, a hot air blower 100 may be used to blow hot air through the interior of the spoolable pipe 12, the heated pipe 16, or both. Certain techniques used for the pipe heater 14 may have a greater effect on the outer surface or layer(s) of the spoolable pipe 12. Thus, blowing hot air through the interior of the spoolable pipe 12 using the hot air blower 100 may heat the inner surface or layer(s) of the spoolable pipe 12, which would help address any memory effect present in the inner layer(s). The hot air may enter a trailing end of the heated pipe 16 or a leading end of the spoolable pipe 12. In addition, blowing hot air through the spoolable pipe 12 may reduce the amount of heating to be provided by using the induction coil 80. Further, blowing hot air through the heated pipe 12 may help the heated pipe 12 to remain at or near a desired temperature as it leaves the thermal enclosure 88. In certain embodiments, the hot air blower 100 may be controlled by the controller 92 or may be omitted.

Figure 5:
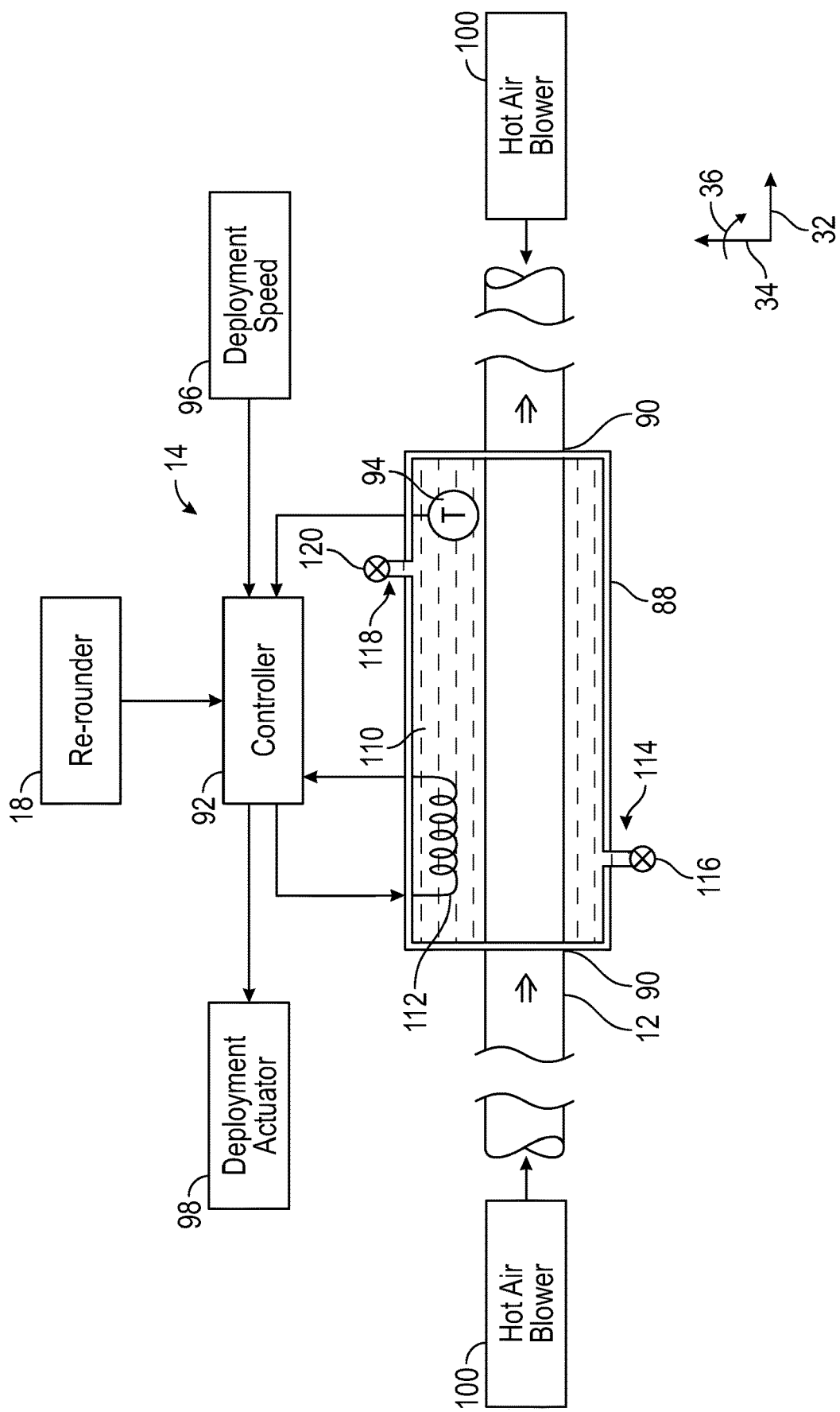
FIG. 5 is a schematic diagram of a pipe heater with a fluid contained within an enclosure according to embodiments of the present disclosure.

FIG. 5 illustrates an embodiment of the pipe heater 14 that uses fluid 110 contained within the thermal enclosure 88 to heat the spoolable pipe 12. The fluid 110 may be water, a heat transfer fluid, air, or any other liquid or gas with a high thermal conductivity. A heating element 112 may be disposed within the thermal enclosure 88 and configured to heat the fluid 110, thereby heating the portion of the spoolable pipe 12 within the thermal enclosure 88 via conductive heating. A variety of different heating techniques may be used for the heating element 112, such as a heating element that converts electricity into heat through resistive or Joule heating. The thermal enclosure 88 may include an inlet 114 that includes an inlet valve 116 to enable filling or emptying the fluid 110 from the thermal enclosure 88. In addition, the thermal enclosure 88 may include a vent 118 that includes a vent valve 120 to enable venting of gases when using a liquid for the fluid 110. The dimensions of the thermal enclosure 88 may be based on a desired heat loss rate, such as during cold-weather operation of the pipe heating and re-rounding system 10. In other respects, the pipe heater 14 of FIG. 5 is similar to the pipe heater 14 shown in FIG. 4. For example, the thermal enclosure 88 may include openings 90 for the spoolable pipe 12 to enter and the heated pipe 16 to exit the thermal enclosure 88. The openings 90 may be sealed to help prevent the fluid 110 from leaving the thermal enclosure 88. The pipe heater 14 shown in FIG. 5 may include the controller 92 to adjust the heating provided by the fluid 110 and heating element 112. The temperature sensor 94 may be used to measure the temperature of the fluid 110 and/or the heated pipe 16. One or more hot air blowers 100 may be used to heat the interior of the spoolable pipe 12 and/or heated pipe 16. In certain embodiments, the heating element 112 in the thermal enclosure 88 may be omitted and instead hot fluid 110 may enter through the inlet valve 116, heat the spoolable pipe 12, and cooled fluid 110 exit through the vent 118.

Figure 6:
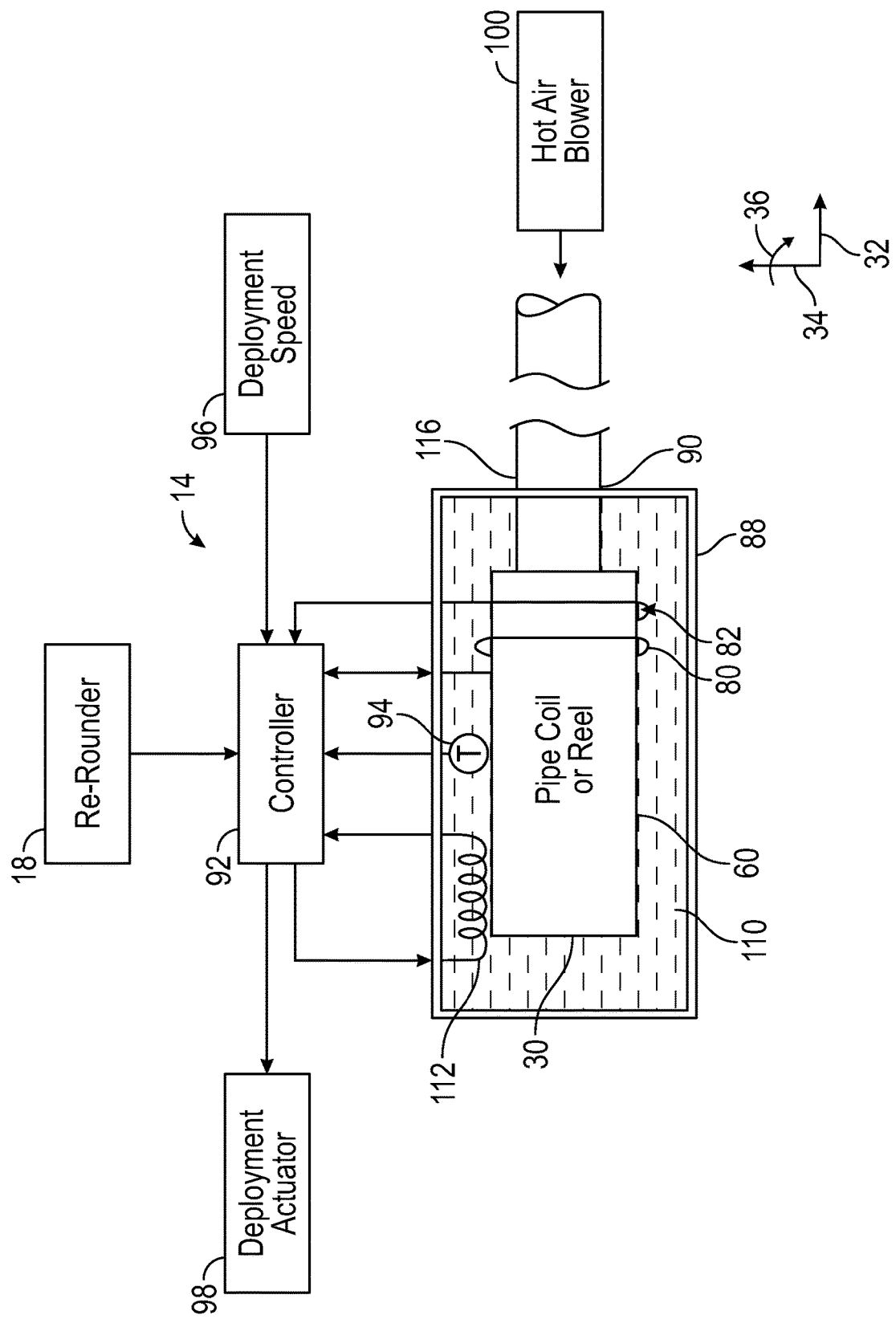
FIG. 6 is a schematic diagram of a pipe heater with spoolable pipe contained within an enclosure according to embodiments of the present disclosure.

FIG. 6 illustrates an embodiment of the pipe heater 14 that includes the coil 30 or reel 60 within the thermal enclosure 88. In other words, the entire coil 30 or reel 60 is heated using the pipe heater 14 of FIG. 6 instead of heating only the portion of the spoolable pipe 12 that passes through the pipe heater 14, as shown in FIGS. 4 and 5. Thus, the pipe heater 14 may be referred to as a coil heater or reel heater. Any of the heating techniques described above may be used to heat the spoolable pipe 12 of the coil 30 or reel 60. For example, coil 30 or reel 60 may be disposed within the interior 82 of the induction coil 80. Alternatively, the coil 30 or reel 60 may be disposed within the fluid 110 heated by the heating element 112. The thermal enclosure 88 may include the opening 90, which may be sealed, for the heated pipe 16 or the coil 30 or reel 60 to exit the thermal enclosure 88. In other words, the heated pipe 16 may be deployed through the opening 90 while the coil 30 or reel 60 remains in the thermal enclosure 88 or the entire coil 30 or reel 60 removed from the thermal enclosure after heating to deploy the heated pipe 16. In other respects, the pipe heater 14 of FIG. 6 is similar to the pipe heaters 14 shown in FIGS. 4 and 5. For example, the pipe heater 14 shown in FIG. 6 may include the controller 92 to adjust the heating provided by using the induction coil 80 or the fluid 110 and heating element 112. The temperature sensor 94 may be used to measure the temperature of the heated pipe 16 or the fluid 110. The hot air blower 100 may be used to heat the interior surfaces and/or layers of the spoolable pipe 12 and/or heated pipe 16.

Figure 7:
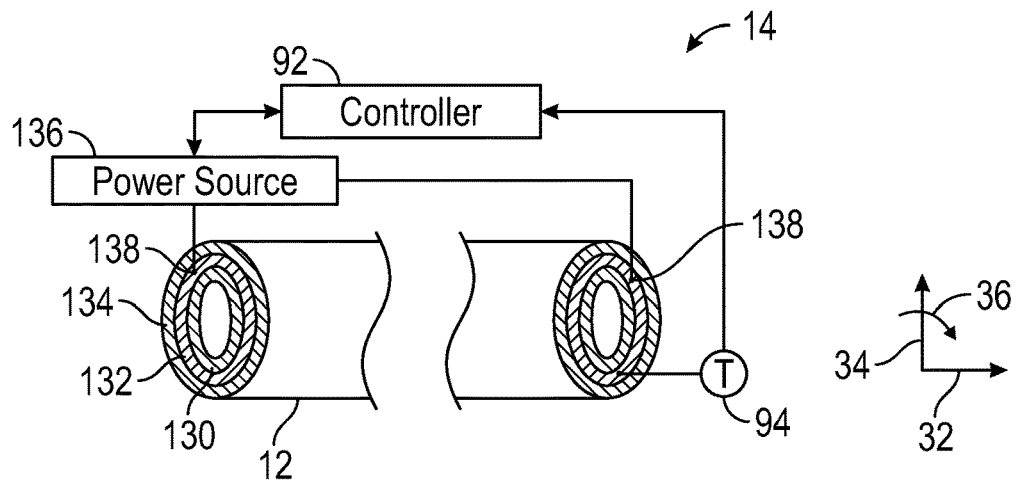
FIG. 7 is a schematic diagram of a pipe heater using resistive heating according to embodiments of the present disclosure.

FIG. 7 illustrates an embodiment of the pipe heater 14 that uses resistive or Joule heating to heat the spoolable pipe 12. As shown in FIG. 7, the spoolable pipe 12 includes a plurality of layers, namely an inner layer 130 (e.g., liner), a middle layer 132 (e.g., steel-reinforced layer), and an outer layer (e.g., shield layer) 134. In certain embodiments, the inner and outer layers 130 and 134 may be made from HDPE and the middle layer 132 may include helically wound steel strips placed over the inner layer 130. In other embodiments, the spoolable pipe 12 may include additional layers. The presence of the steel in the middle layer 132 makes it electrically conductive. As shown in FIG. 7, a power source 136 may be electrically connected to the middle layer 132 via connectors 138. The passage of an electric current through the middle layer 132 produces heat, thereby heating the spoolable pipe 12. In certain embodiments, the temperature sensor 94 may be used to measure the temperature of the inner layer 130, middle layer 132, outer layer 134, or the air surrounding the spoolable pipe 12. Thus, the controller 92 may be used to adjust the operation of the power source 136 based on the measured temperature. For example, once the spoolable pipe 12 reaches a desired temperature to become heated pipe 16, the power source 136 may be shut off and the heated pipe 16 sent to the pipe re-rounder 18. As described previously, the hot air blower 100 may be used to help maintain the temperature of the heated pipe 16. In addition, the spoolable pipe 12 may be disposed in the thermal enclosure 88 during the heating process to help contain heat within the thermal enclosure 88, as described above with respect to FIG. 6.

Figure 8:
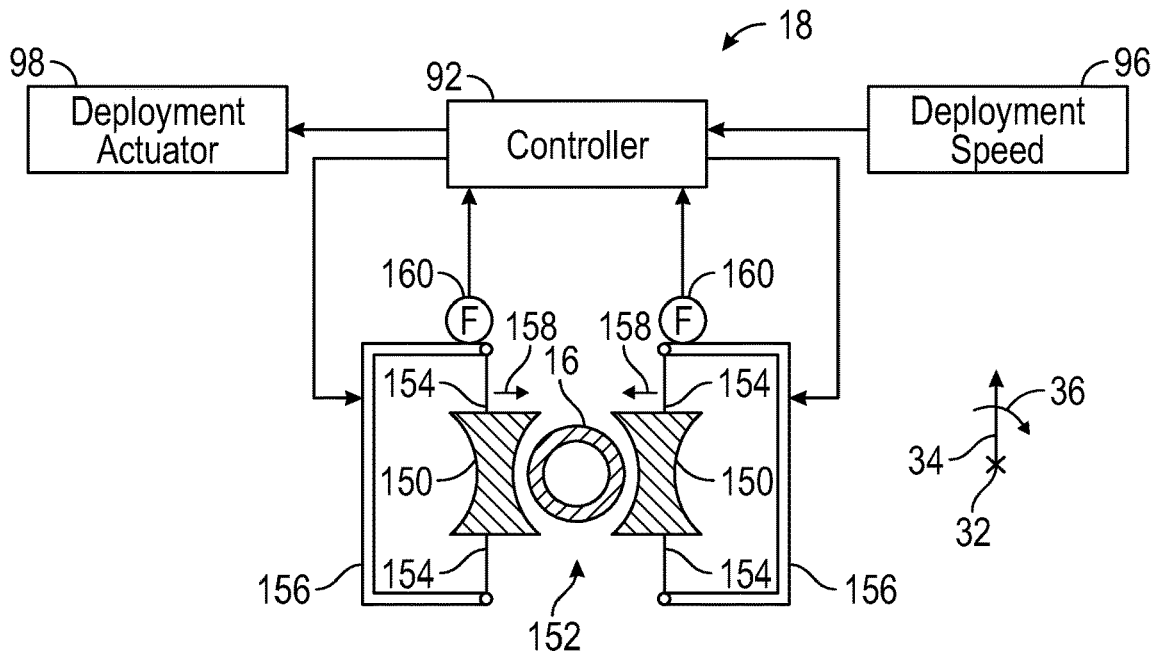
FIG. 8 is a schematic diagram a pipe re-rounder according to embodiments of the present disclosure.

FIG. 8 illustrates an embodiment of the pipe re-rounder 18. The heated pipe 16 from the pipe heater 14 passes through a pair of rollers 150 located approximately 180 degrees apart from one another that engages with an outer surface 152 of the heated pipe 16 to provide the rounded pipe 20. The rollers 150 may be made from a variety of materials, such as, but not limited to, polymers, metals, ceramics, composite materials, and so forth. The selection of a particular material for the rollers 150 may be based on several factors, such as compatibility with the outer surface of the heated pipe 16, durability, toughness, coefficient of friction, operating temperatures, and so forth. As shown in FIG. 8, the rollers 150 may have an hour-glass cross-sectional shape that shapes the heated pipe 16, which may have an oval shape, into the circular shape of the rounded pipe 20. In other embodiments, the rollers 150 may have other cross-sectional shapes, such as squares, rectangles, circles, ovals, and so forth. The rollers 150 may be coupled to axles 154 that are coupled to actuators 156 (e.g., hydraulic actuators) that are used to push each roller 150 against the outer surface 152 of the heated pipe 16 in the direction of arrows 158. Although shown pushing against the heated pipe 16 in a horizontal direction (e.g., parallel to axial direction 32) in FIG. 8, the rollers 150 may be oriented to push against the heated pipe in a vertical direction (e.g., perpendicular to axial direction 32) or any other direction.

In certain embodiments, a plurality of pairs of rollers 150 may be used. For example, a first pair of rollers 150 may be oriented to push against the heated pipe 16 in the horizontal direction and a second pair of rollers 150 disposed axially 32 away from the first pair to push against the heated pipe 16 in the vertical direction or other non-horizontal direction to distribute forces across a wider circumferential 36 area of the outer surface 152 of the heated pipe 16. In further embodiments, the size (e.g., radius of curvature) of the rollers 150 may selected based on the outside diameter of the spoolable pipe 12. For example, rollers 150 corresponding to 8-inch pipe may be used when re-rounding 8-inch spoolable pipe 12. Alternatively, a small pair of rollers 150 may be used for pipe diameters ranging from approximately 2 inches to 4 inches, and a large pair of rollers 150 may be used for pipe diameters ranging from approximately 6 inches to 8 inches. In addition, the spacing between the rollers 150 may be adjusted to accommodate different pipe sizes, and the adjustment may be made manually or automatically (e.g., hydraulically). Another embodiment using more than one pair of rollers 150 is described below with respect to FIG. 9.

In certain embodiments, the controller 92 shown in FIG. 8 may be used to adjust the heating provided by the pipe heater 14 based on the amount of force provided by the rollers 150. For example, force sensors 160 may provide signals to the controller 92 indicative of the force exerted against the heated pipe 16 by the rollers 150. If the measured force used to round the heated pipe 16 is greater than a desired force, then the controller 92 may increase the amount of heating provided by pipe heater 14. Similarly, if the measured force is less than the desired force, then the controller 92 may decrease the amount of heating. In certain embodiments, the controller 92 may be used to adjust the deployment speed of the spoolable pipe 12, heated pipe 16 and/or rounded pipe 20. For example, if the measured force is greater than the desired force, then the controller 92 may slow the deployment speed by sending a signal to the deployment actuator 98. Similarly, if the measured force is less than the desired force, then the controller 92 may increase the deployment speed via the deployment actuator 98. In further embodiments, the controller 92 may be used to adjust the amount of force provided by the rollers 150 via the actuators 156 based on other measurements of the roundness of the rounded pipe 20, such as manual or automatic measurements of ovality.

Figure 9:
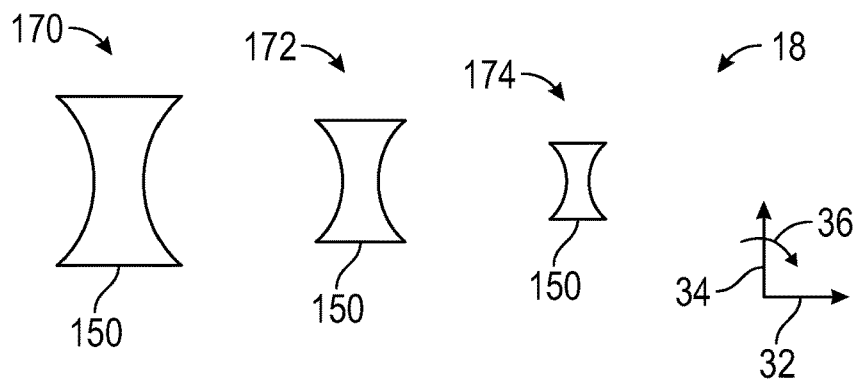
FIG. 9 is a schematic diagram of pipe re-rounder with more than one pair of rollers according to embodiments of the present disclosure.

FIG. 9 illustrates an embodiment of the pipe re-rounder 18 with more than one pair of rollers 150. The heated pipe 16 may enter the pipe re-rounder 18 through a first pair 170 of rollers 150, then pass through a second pair 172 of rollers 150, and then pass through a third pair 174 of rollers 150. In other embodiments, more than three pairs of rollers 150 may be used. The axial 32 spacing between each of the pairs 170, 172, and 174 may be manually or automatically (e.g., hydraulically) adjusted. The outside diameter of the spoolable pipe 12 may determine which of the pairs of rollers 150 is used. For example, if the outside diameter of the spoolable pipe 12 is relatively small, then all three pairs 170, 172, and 174 may be used. The first two pairs 170 and 172 may not provide re-rounding of the heated pipe 16, but may help to guide the heated pipe to the third pair 174, which rounds the heated pipe 16 to provide the rounded pipe 20. In other embodiments, the re-rounding may be distributed across more than one pair of rollers 150. In other words, the first pair 170 may be used to provide a first portion of re-rounding and the second pair 172 used to provide a second portion of re-rounding. If the outside diameter of the spoolable pipe is relatively large, then only the first pair 170 may be used and the second and third pairs 172 and 174 retracted out of the way of the heated pipe 16. Providing a plurality of pairs of rollers 150 in one pipe re-rounder 18 may simplify re-rounding by reducing the number of different components to be provided to accommodate re-rounding different pipe diameters of spoolable pipe 12. In other words, a pipe re-rounder 18 with a plurality of pairs of rollers 150 may be used for several different pipe diameters instead of specifying different pipe re-rounders 18 or different rollers 150 for different pipe diameters. Further, although specific embodiments of the pipe re-rounder 18 shown in FIGS. 8 and 9 have been described in terms of roller-based re-rounders, other types of re-rounders and re-rounding techniques may also be used for the pipe re-rounder 18. For example, the pipe re-rounder 18 may use a clamp or other device to push against some or all of the outer surface 152 of the heated pipe 16 to provide the rounded pipe 20. Embodiments of the pipe re-rounder 18 may be used on a continuous basis as the heated pipe 16 passes through the pipe re-rounder 18.

Figure 10:
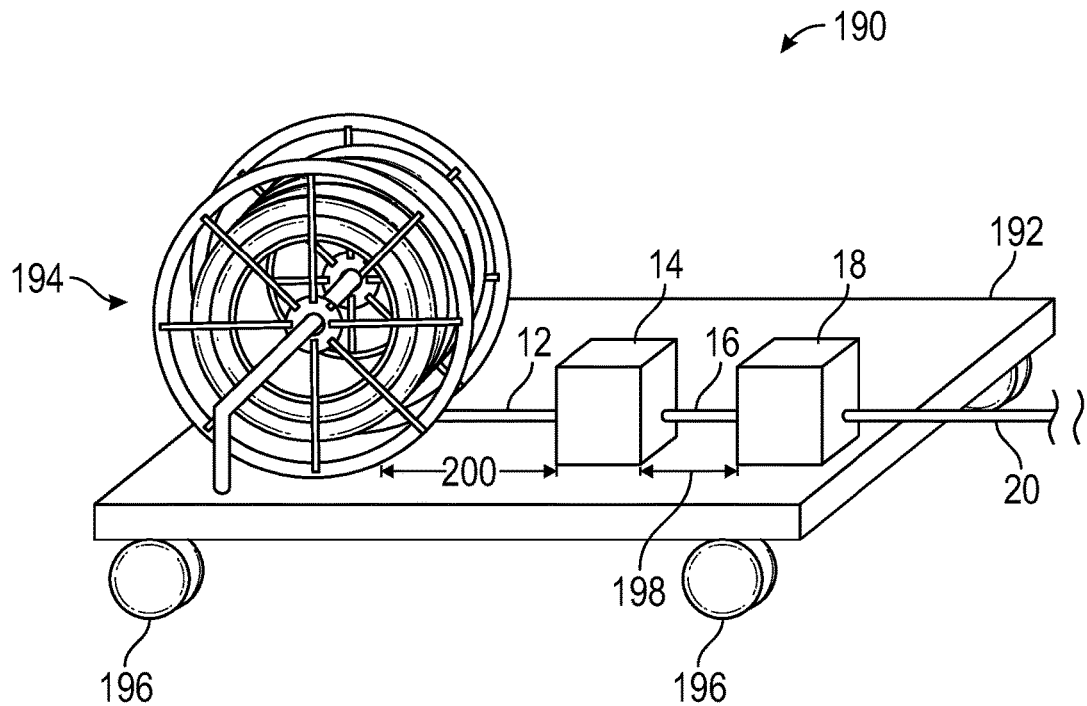
FIG. 10 is a perspective view of a deployment trailer having the pipe heater and the pipe re-rounder according to embodiments of the present disclosure.

FIG. 10 illustrates an embodiment of a deployment trailer 190 having the pipe heater 14 and the pipe re-rounder 18. As shown in FIG. 10, the deployment trailer 190 includes a trailer bed 192 with the pipe heater 14 and the pipe re-rounder 18 coupled to the trailer bed 192. In addition, a spoolable pipe deployment device 194 is coupled to the trailer bed 192. The spoolable pipe deployment device 194 may be one of several different devices used to deploy coils 30 or reels 60 in various configurations, such as, but not limited to, eye-to-the-sky or eye-to-the-side. Wheels 196 may be coupled to the trailer bed 192 to enable it to be moved. As shown in FIG. 10, a first distance 198 between the pipe heater 14 and the pipe re-rounder 18 may be reduced to help decrease the amount of heat lost to the environment by the heated pipe 16 before re-rounding. In addition, a second distance 200 between the spoolable pipe deployment device 194 and the pipe heater 14 may be reduced to decrease the length of spoolable pipe 12 that leaves the coil 30 or reel 60 without being heated. In further embodiments, other forms of transportation, such as ships, may be used to deploy the rounded pipe 20 depending on where the rounded pipe is installed. For example, a ship may include the spoolable pipe deployment device 194, pipe heater 14, and pipe re-rounder 18.

Figure 11:
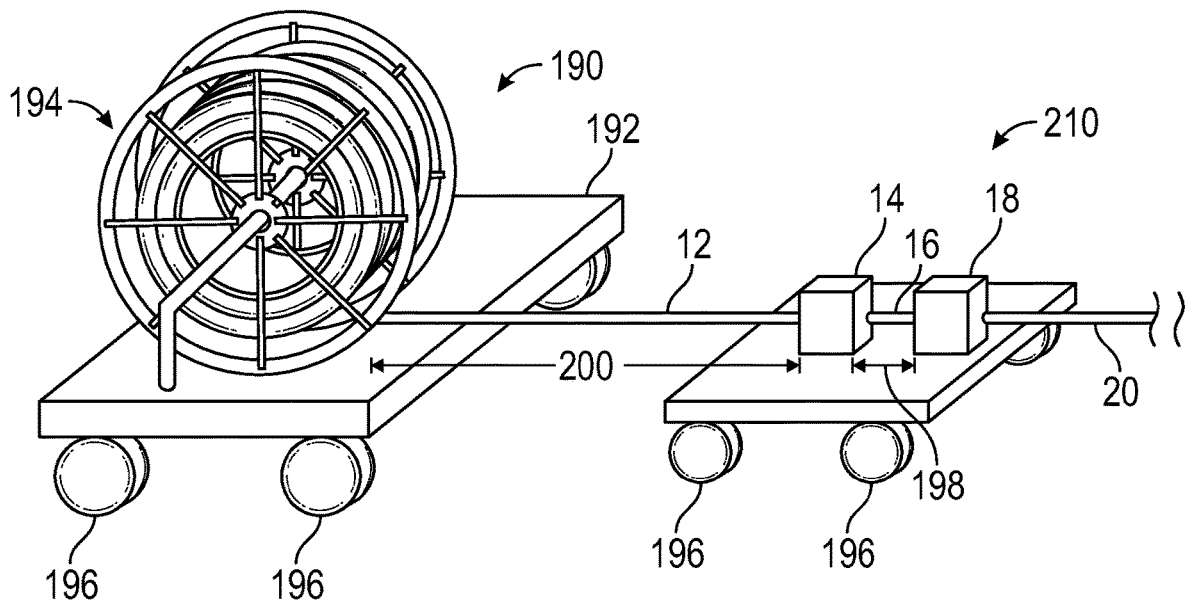
FIG. 11 is a perspective view of a deployment trailer and a pipe heating and re-rounding trailer having the pipe heater and the pipe re-rounder according to embodiments of the present disclosure.

FIG. 11 illustrates an embodiment of the deployment trailer 190 and a pipe heating and re-rounding trailer 210 having the pipe heater 14 and the pipe re-rounder 18. As shown in FIG. 11, the spoolable pipe deployment device 194 is coupled to the trailer bed 192, and the pipe heater 14 and the pipe re-rounder 18 are coupled to the pipe heating and re-rounding trailer 210. As with the deployment trailer 190 shown in FIG. 10, the first distance 198 between the pipe heater 14 and the pipe re-rounder 18 may be reduced to help decrease the amount of heat lost to the environment by the heated pipe 16. The second distance 200 between the spoolable pipe deployment device 194 and the pipe heater 14 is longer than that shown in FIG. 10, but the pipe heating and re-rounding trailer 210 provides additional flexibility because it can be used with a variety of different deployment trailers 190. In certain embodiments, the pipe heating and re-rounding trailer 210 may be coupled closely to the deployment trailer 190 to help decrease the length of the second distance 200. In further embodiments, the pipe heating and re-rounding trailer 210 may be configured as a skid (e.g., without wheels 196) and mounted or attached to the trailer bed 192 or other forms of transportation.

Figure 12:
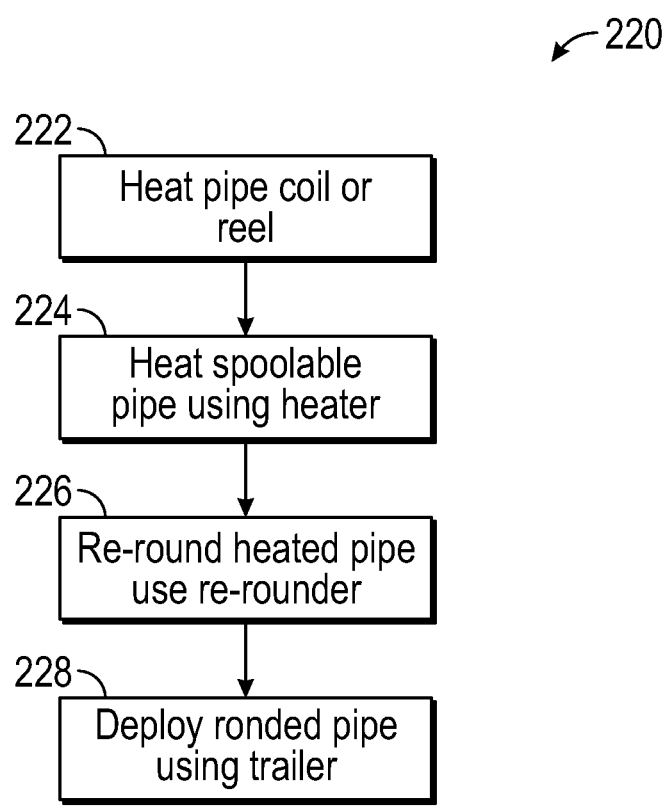
FIG. 12 is a flow chart of a process for heating and re-rounding spoolable pipe according to embodiments of the present disclosure.

FIG. 12 is a flow chart showing an embodiment of a process 220 for heating and re-rounding spoolable pipe 12. Some or all of the steps of the process 220 may be implemented as computer instructions or executable code stored in memory and executable by a processor of the controller 92. In block 222, the process 220 includes heating the spoolable pipe 12 stored as the coil 30 or on the reel 60. For example, the embodiment of the pipe heater 14 shown in FIG. 6 or 7 may be used to heat the coil 30 or reel 60. In certain embodiments, block 222 may be omitted. In block 224, the process 220 includes heating the spoolable pipe 12 using the pipe heater 14 to provide the heated pipe 16. For example, the embodiments of the pipe heaters 14 shown in FIG. 4 or 5 may be used to heat the spoolable pipe 12. When both blocks 222 and 224 are used, block 222 may be used to reduce the amount of heating provided by the pipe heater in block 224. In certain embodiments, block 224 may be omitted when block 222 provides the heated pipe 16. In block 226, the heated pipe 16 is re-rounded using the pipe re-rounder 18 to provide the rounded pipe 20. For example, the embodiments of the pipe re-rounders 18 shown in FIG. 8 or 9 may be used to re-round the heated pipe 16. In block 228, the rounded pipe 20 is deployed. For example, the embodiment of the deployment trailer 190 shown in FIG. 10 or the embodiment of the deployment trailer 190 and pipe heating and re-rounding trailer 210 shown in FIG. 11 may be used to deploy the rounded pipe 20. As mentioned above, other forms of transportation, such as ships, may also be used to deploy the rounded pipe 20.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system, comprising:
   a pipe heater configured to heat spoolable pipe to provide a heated spoolable pipe;
   a pipe re-rounder configured to re-round the heated spoolable pipe to provide a rounded spoolable pipe; and
   a deployment trailer, wherein the deployment trailer comprises:
      a trailer bed;
      a spoolable pipe deployment device coupled to the trailer bed;
      the pipe heater coupled to the trailer bed; and
      the pipe re-rounder coupled to the trailer bed.

2. The system of claim 1, wherein the pipe heater comprises an induction coil configured to heat the spoolable pipe as the spoolable pipe passes through an interior of the induction coil.

3. The system of claim 1, wherein the pipe heater comprises:
   an enclosure configured to enclose at least a portion of the spoolable pipe;
   a fluid contained within the enclosure; and
   a heating element disposed within the enclosure, wherein the heating element is configured to heat the fluid thereby heating the portion of the spoolable pipe within the enclosure.

4. The system of claim 1, further comprising a hot air blower configured to blow hot air through an interior of the spoolable pipe.

5. The system of claim 1, wherein the pipe re-rounder comprises a pair of rollers configured to engage with an outer surface of the heated spoolable pipe to provide the rounded spoolable pipe.

6. The system of claim 1, wherein the pipe re-rounder comprises:
   a first pair of rollers configured to engage with heated spoolable pipe having a first outer diameter; and
   a second pair of rollers configured to engage with heated spoolable pipe having a second outer diameter.

7. The system of claim 1, further comprising:
   a controller configured to control the pipe heater and the pipe re-rounder, wherein the controller comprises a processor configured to:
   heat the spoolable pipe using the pipe heater; and
   re-round the heated spoolable pipe using the pipe re-rounder.

8. The system of claim 7, comprising a temperature sensor configured to provide a signal indicative of a temperature of the heated spoolable pipe to the controller.

9. The system of claim 7, comprising:
   a deployment actuator configured to adjust a deployment speed of the rounded spoolable pipe based on a desired speed signal from the controller; and
   a deployment speed sensor configured to provide a signal indicative of the deployment speed to the controller.

10. The system of claim 7, comprising:
    a re-rounder actuator configured to adjust a re-rounding force applied to the heated spoolable pipe based on a desired re-rounding force signal from the controller; and
    a re-rounding force sensor configured to provide a signal indicative of the re-rounding force to the controller.

11. The system of claim 7, wherein the pipe heater comprises an induction coil configured to heat the spoolable pipe as the spoolable pipe passes through an interior of the induction coil.

12. A system, comprising:
  a pipe heater configured to heat spoolable pipe to provide a heated spoolable pipe;
  a pipe re-rounder configured to re-round the heated spoolable pipe to provide a rounded spoolable pipe; and
  a deployment trailer comprising:
    a deployment trailer bed;
    a spoolable pipe deployment device coupled to the trailer bed; and
    a pipe heating and re-rounding trailer comprising a heating and re-rounding trailer bed, wherein the pipe heater and the pipe re-rounder are coupled to the heating and re-rounding trailer bed, and the heating and re-rounding trailer bed is coupled to the deployment trailer.

13. The system of claim 12, wherein the pipe heater comprises:
  an enclosure configured to enclose at least a portion of the spoolable pipe;
  a fluid contained within the enclosure; and
  a heating element disposed within the enclosure, wherein the heating element is configured to heat the fluid thereby heating the portion of the spoolable pipe within the enclosure.

14. The system of claim 12, further comprising a hot air blower configured to blow hot air through an interior of the spoolable pipe.

15. The system of claim 12, wherein the pipe re-rounder comprises a pair of rollers configured to engage with an outer surface of the heated spoolable pipe to provide the rounded spoolable pipe.

16. The system of claim 12, wherein the pipe re-rounder comprises:
  a first pair of rollers configured to engage with heated spoolable pipe having a first outer diameter; and
  a second pair of rollers configured to engage with heated spoolable pipe having a second outer diameter.

17. The system of claim 12, further comprising:
  a controller configured to control the pipe heater and the pipe re-rounder, wherein the controller comprises a processor configured to:
  heat the spoolable pipe using the pipe heater; and
  re-round the heated spoolable pipe using the pipe re-rounder.

18. The system of claim 17, comprising a temperature sensor configured to provide a signal indicative of a temperature of the heated spoolable pipe to the controller.

19. The system of claim 17, comprising:
  a deployment actuator configured to adjust a deployment speed of the rounded spoolable pipe based on a desired speed signal from the controller; and
  a deployment speed sensor configured to provide a signal indicative of the deployment speed to the controller.

20. The system of claim 17, comprising:
  a re-rounder actuator configured to adjust a re-rounding force applied to the heated spoolable pipe based on a desired re-rounding force signal from the controller; and
  a re-rounding force sensor configured to provide a signal indicative of the re-rounding force to the controller.

* * * * *